United States Patent
Steffens et al.

(10) Patent No.: US 7,092,456 B2
(45) Date of Patent: Aug. 15, 2006

(54) PROCESS FOR SYNCHRONIZATION

(75) Inventors: Johannes Steffens, Grafing (DE); Hagen Eckert, Mering (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 647 days.

(21) Appl. No.: 09/865,484

(22) Filed: May 29, 2001

(65) Prior Publication Data
US 2002/0009166 A1  Jan. 24, 2002

(30) Foreign Application Priority Data
Jun. 2, 2000  (DE) ................. 100 27 389

(51) Int. Cl.
*G21D 7/00* (2006.01)
*G21C 23/00* (2006.01)
*G21C 1/04* (2006.01)
*H04L 7/00* (2006.01)

(52) U.S. Cl. ............. 375/320; 375/343; 375/354; 455/525

(58) Field of Classification Search ........ 375/261–354, 375/148; 455/525, 142
See application file for complete search history.

(56) References Cited

U.S. PATENT DOCUMENTS

| | | | | |
|---|---|---|---|---|
| 5,602,833 A | * | 2/1997 | Zehavi | 370/209 |
| 5,640,679 A | * | 6/1997 | Lundqvist et al. | 455/525 |
| 5,796,774 A | * | 8/1998 | Kato | 375/146 |
| 6,487,236 B1 | * | 11/2002 | Iwamatsu et al. | 375/148 |
| 6,690,751 B1 | * | 2/2004 | Nikula et al. | 375/341 |
| 6,731,704 B1 | * | 5/2004 | Kiyanagi | 375/346 |

FOREIGN PATENT DOCUMENTS

| DE | 4212194 | 10/1992 |
|---|---|---|
| WO | WO99/20023 | 4/1999 |

* cited by examiner

*Primary Examiner*—Khai Tran
*Assistant Examiner*—Cicely Ware
(74) *Attorney, Agent, or Firm*—Birch, Stewart, Kolasch & Birch, LLP

(57) ABSTRACT

A process for synchronization of an input signal (S) involves demodulating (5a) the input signal (S) according to a particular demodulation method (AM) using a particular signal parameter for creation of a demodulated input signal ($S_{AM}$); correlating (6a) the demodulated input signal ($S_{AM}$) with a comparison signal (f (AM,Signal)) which depends on the demodulation method (AM) to determine a time offset ($\tau$) between the demodulated input signal ($S_{AM}$) and the comparison signal (f (AM,Signal)); and time displacing, or shifting, the input signal through the time offset ($\tau$) calculated from the correlation.

12 Claims, 2 Drawing Sheets

PROCESS FOR SYNCHRONIZATION

BACKGROUND OF THE INVENTION

This application claims a priority benefit from German Application No. 100 27 389.0, filed on Jun. 2, 2000, and the contents on that priority application are incorporated herein by reference.

This invention concerns a process of synchronization of a signal by detection of synchronization patterns, for example in mobile wireless signals.

Mobile wireless signals are normally transmitted as bursts, with a synchronization sequence being transmitted in each burst that makes demodulation easier for the receiver during amplitude variations (fading) and multi-path reception and which allows an estimation of a channel pulse response. In this regard, either a fixed synchronization sequence is transmitted or a transmitted synchronization sequence is chosen from a limited number of possible synchronization sequences.

A test demodulator for such signals has the function of determining exactly a time relationship of the signals, measuring using a weighting filter and relating time-wise, with a high relative exactness, to the sent synchronization sequence. If a plurality of various synchronization sequences are transmitted, it must first be determined which synchronization sequence is present in a concrete, or definite, burst. In addition, a time-wise position of the synchronization sequence must be determined and an input signal is, if necessary for a particular case, time-wise shifted so that there is a defined time position of the input signal.

Normally, this is accomplished by having the input signal demodulated by an I/Q demodulator at the bit level and it is searched for the synchronization sequence at the bit level. In this manner, the relative time-wise position of the synchronization sequence within the input signal can be determined and the input signal can be accordingly shifted.

It is disadvantageous in this procedure that there is a relatively high calculation demand for demodulating data contents down to the bit level.

Accordingly, it is an object of this invention to provide a process for synchronization of a signal with a reduced calculation requirement.

SUMMARY OF THE INVENTION

According to principles of this invention, a process for synchronization of an input signal involves the process steps of: demodulating an input signal using a first demodulation method employing a first signal parameter for creating a first demodulated input signal; correlating the first demodulated input signal with a first comparison signal that depends upon the first demodulation method to determine a time offset between the first demodulated input signal and the first comparison signal; and time-wise shifting, or displacing, the input signal according to the time-wise offset determined by correlation.

This invention is based on the recognition that an uncomplicated detection of the synchronization sequence by demodulation of the input signal cannot be achieved down to the bit level, rather it can only be achieved through demodulation relative to, or employing, a first signal parameter, such as amplitude. This demodulation, for example, an amplitude demodulation, can take place at either an analog signal level or even at a digital-signal level.

Contrary to a complete demodulation down to the bit level by an I/Q demodulator, there is a substantially smaller calculation requirement. Such a demodulated input signal is then correlated with a comparison signal. The comparison signal can be obtained by a one time application of the same demodulation, for example amplitude demodulation, to the synchronization sequence, or, if a plurality of synchronization signals is to be compared, to each of the synchronization sequences. The correlation, therefore, does not take place at the bit level. With the correlation one can obtain an indication of the time-wise relative offset, relative to the comparison signal. By displacing, or shifting, the input signal by the offset amount, one can accomplish a synchronization of the input signal. Further beneficial enhancements of this inventive process are described and claimed herein.

Preferably, demodulation does not take place relative to only one signal parameter, such as relative to amplitude, rather relative to further signal parameters such as frequency, with the signal being subjected to various demodulations in separate demodulation branches, for example an amplitude modulation and a frequency modulation. In each demodulation branch a correlation with a comparison signal created by a corresponding demodulation of the synchronization sequence, or sequences, takes place.

The demodulation method can be defined by arbitrary analytically or intermittently defined functions, with a different function being applied to an input signal in each demodulation branch. A comparison signal is respectively developed from each respective synchronization sequence or synchronization sequences, with the synchronization sequence being subjected to the same demodulation function. In addition to an amplitude demodulation and a frequency demodulation it is also possible, to use a logarithm of an amplitude demodulation or time-wise differential of a frequency demodulation, as well as a phase demodulation, with these only being examples of possible demodulation functions.

Preferably, the various time offsets between the demodulated input signals and the comparison signals obtained in the various demodulation branches are subjected to a weighting. In a simplest case, there can be identical weighting in each demodulation branch so that the time offset by which the input signal is shifted is the average of the results of the various correlations in the various demodulation branches. Preferably, however, each demodulation branch is measured by a different weighting whereby the highest possible exactness and the smallest possible variation of the produced time offset is achieved with the process of this invention.

In order to improve the exactness of the correlation results, each of the correlation results can be subjected to an interpolation. With an interpolation, an equalizing, or balancing, function, for example, a polynom of predetermined order is passed through sampling positions of the correlation results so that the time offset between the sampling positions can be more exactly estimated.

Before or after an analog/digital conversion of the input signal, a filtering can take place. The filtering can be carried out at the very beginning of the process. It is, however, also possible to subject each demodulation path to a different filtering and to adapt the filtering to the respective demodulation method. In this manner, one demodulation method can also be crossed into the others.

In order to shift, or displace, the input signal by particular values, which are not multiples of the sampling period, an interpolation also preferably takes place during the time-wise shifting of the input signals.

BRIEF DESCRIPTION OF THE DRAWINGS

Further benefits, characteristics and details of the invention are explained in more detail below using embodiments shown in the drawings. The described and drawn features can be used individually or in preferred combinations in other embodiments of the invention. The foregoing and other objects, features and advantages of the invention will be apparent from the following more particular description of the preferred embodiments of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Before embodiments of the process of this invention are described in more detail with reference to FIGS. 1 and 2, an example of EDGE-burst is first explained with the use of FIG. 3 to aid in the understanding of the invention; although it should be understood that the invention is not limited to EDGE signals, rather it is only described using EDGE signals. The invention is suitable, for example, also for GSM signals.

Figure 3:
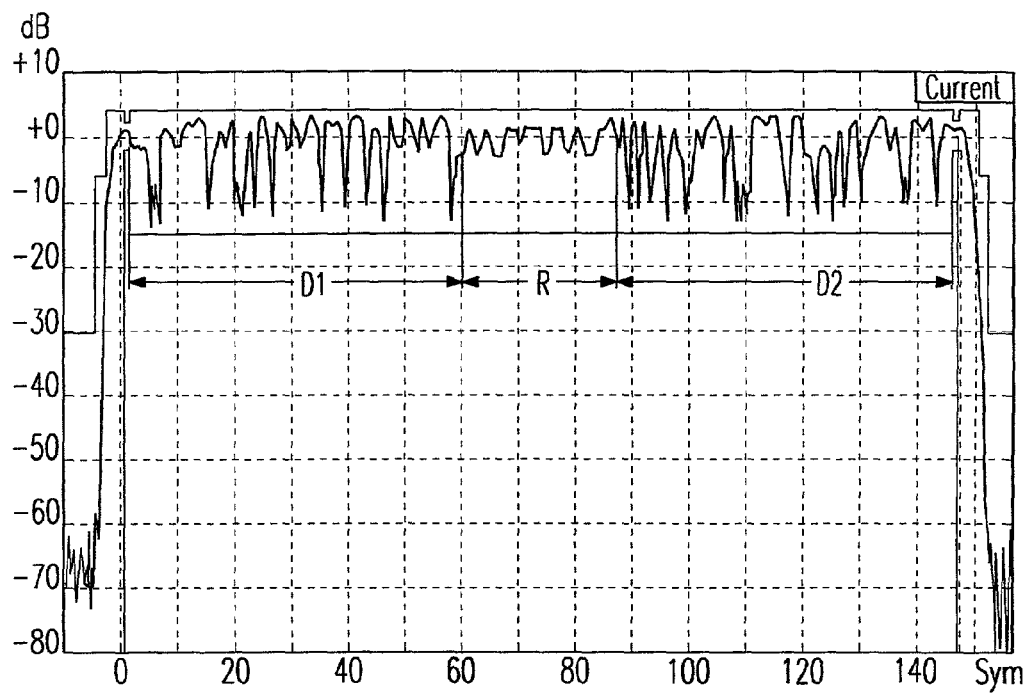
FIG. 3 is a diagram illustrating an example of an EDGE-burst.

The amplitude of an EDGE-burst is represented in FIG. 3 as a function of time, the time being scaled in symbols. From a total of 147 transmitted data symbols, 26 data symbols are in the middle forming a reference, or synchronization, sequence R, flanked by data areas D1 and D2. Upon reception of such EDGE-bursts, demodulation is made easier for the receiver by the synchronization sequence R, particularly when there is fading and multi-path reception.

In order to be able to measure the data areas D1 and D2 with little error, a time-wise relative position of the GSM-burst or EDGE-burst must be exactly determined. This is normally accomplished by use of the synchronization sequence R whose data content is known. The synchronization sequence R of a particular EDGE-burst is chosen from a predetermined limited number of possible synchronization sequences. It must, therefore, first be determined which synchronization sequence R is contained in the particular EDGE-burst and then a relative time-wise displacement, or shifting, of this synchronization sequence R must be determined. Until now, this has usually been accomplished by demodulating the received synchronization sequence R down to the bit level using an I/Q demodulator and comparing the bit pattern with a bit pattern of the possible synchronization sequence. This process is, however, disadvantageous because it involves calculation requirements of demodulating down to the bit level.

Figure 1:
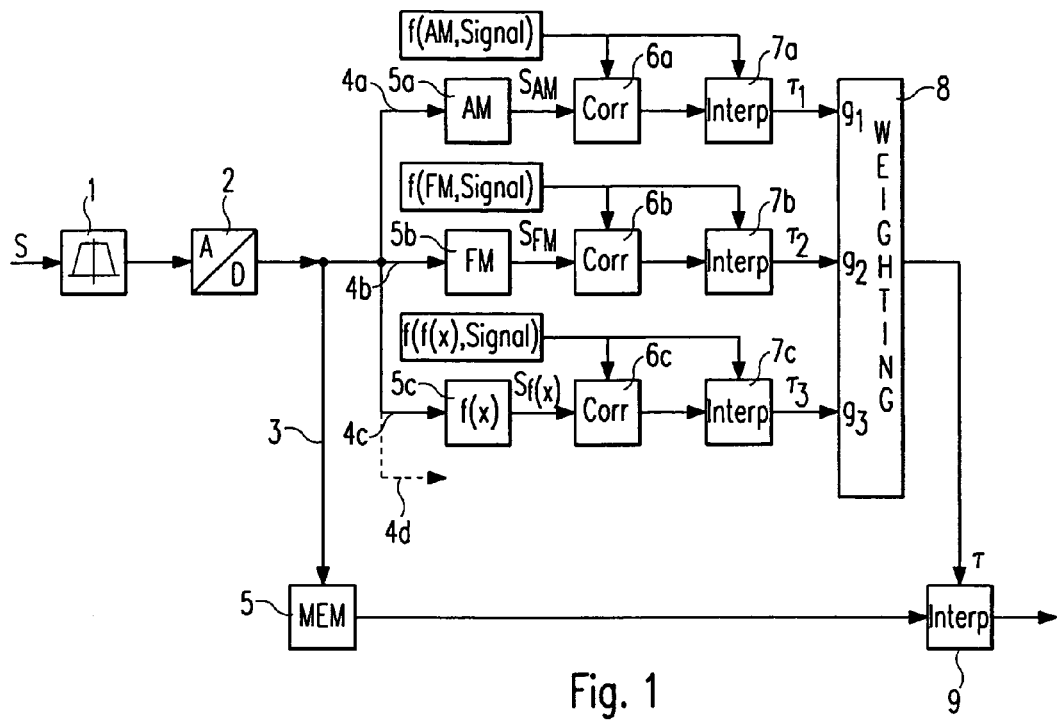
FIG. 1 is a block diagram illustrating a first embodiment of the process of this invention.

FIG. 1 shows a first embodiment of the process of this invention.

An input signal, for example, an EDGE-burst or GSM-burst, is fed through a band-limiting filter 1 and then to an analog/digital converter 2. After the analog/digital converter, the input signal branches into a measuring branch 3 and into at least one demodulation branch 4a. Preferably, however, a plurality of demodulation branches are provided, there being three demodulation branches 4a through 4c represented, for example, in the drawn embodiment, and further demodulation branches 4d being indicated. The signal is fed to a memory 5 via the measuring branch 3.

In each of the demodulation branches 4a through 4c, the signal is respectively fed to a demodulator 5a to 5c that respectively demodulates the input signal with a demodulation method different from the others, that is, in relation to, or using, a different signal parameter or parameters. For example, in the first demodulator 5a of the first demodulation branch 4a, an amplitude demodulation is carried out, thus the relevant signal parameter is the amplitude, that is the value. In the second demodulator 5b of the second demodulation branch 4b, a frequency demodulation is carried out, so that this is a demodulation in which frequency is the relevant signal parameter. In the third demodulation branch 4c the demodulation is shown to be effectively generalized in that the input signal S is subjected to a function f(x=S), with sampled values of a digitized input signal S respectively forming a variable of the function f(x). In this regard, basically, any analytical, or intermittently defined function is suitable. For example, the input signal S can be made logarithmic or time differentiated. Also, various functions can be combined with one another; for example, first an amplitude demodulation can be carried out and then a logarithm of the amplitude-demodulated signal can be created. Also, a frequency demodulation can be first carried out and then a time differential can be formed so that altogether a phase demodulation d/dt (FM) =PM results. Contrary to processes in the prior art, here no demodulation takes place at the bit level, rather, the input signal S is, to a certain extent, subjected to weighting functions f(x) in order to create input signals $S_{AM}$, $S_{FM}$, $S_{f(x)}$, that respectively are particularly characterized by different signal parameters, for example, amplitude or frequency.

In each of the correlation stages 6a through 6c that is coupled to the demodulator 5a through 5c, a correlation of the respective demodulated input signal $S_{AM}$, $S_{FM}$, or $S_{f(x)}$, with a corresponding comparison signal f (AM, signal), f (FM, signal) or f (f(x), signal) is carried out. These comparison signals are created by subjecting the known synchronization sequence R of FIG. 3 to the demodulation method of the corresponding demodulation branch with identical filtering. For example, the comparison signal for the first demodulation branch 4a is created by amplitude modulation of the synchronization sequence R and the comparison signal for the second demodulation branch 4b is created by frequency demodulation of the synchronization sequence R. If one of a plurality of possible synchronization sequences is transmitted, each of the possible synchronization sequences is accordingly demodulated, and, using the correlation results in the correlation stages 6a through 6c, by first picking the largest amplitude of the correlation peaks, it can be determined which synchronization sequence is to be transmitted, or used, in the examined burst. Finally, the time-wise position of the correlation peak is determined which allows a measurement for the time-wise offset of the input signal S relative to the comparison signal.

Figure 4:
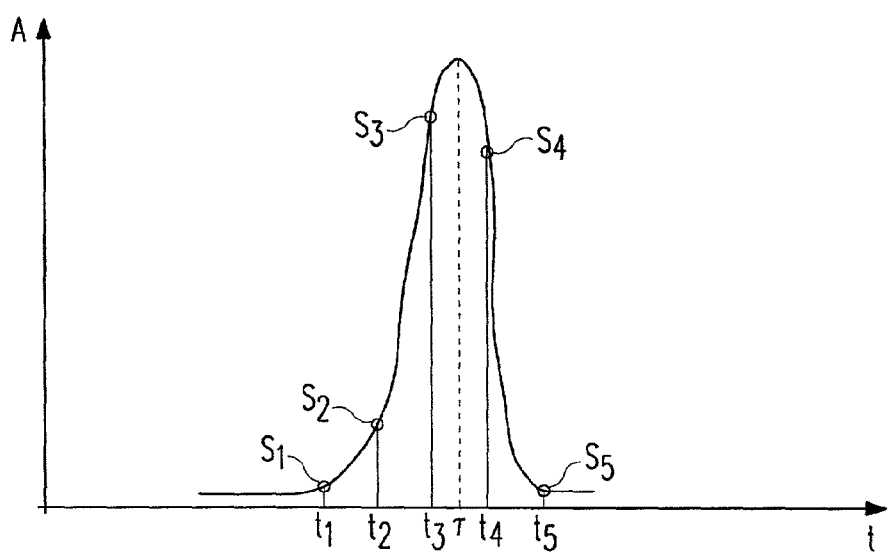
FIG. 4 is a diagram illustration an interpolation.

In the shown, preferred embodiment the correlation stages 6a through 6c are coupled to interpolation stages 7a through 7c that are optional and not necessary. The interpolation stages 7a through 7c make possible an interpolation of correlation results, even between sampled positions of the digitized input signal S, to provide a more exact determination of a maximum. FIG. 4 makes this clear. FIG. 4 shows amplitudes A of a correlation function at an output of one of the correlation stages 6a and 6c, taken the sampling positions $S_1$ through $S_5$ corresponding to points in time $t_1$ to $t_5$. If only the criteria of the largest amplitude at the sampling points $t_1$ to $t_5$ is used to determine the time offset τ, then the result would be τ=$t_3$. Actually however, the maximum of the correlation function lies between the sampling time points $t_3$ and $t_5$. The exact position of the maximum can be determined by an interpolation method, for example, a polynom of a certain order is placed through support points $S_1$ through $S_5$.

The time offsets $τ_1$ through $τ_3$ in the various demodulation branches 4a through 4c, in the shown preferred embodiment, are fed to a weighting stage 8 which weights the time offsets $τ_1$ through $τ_3$ received in the individual demodulation branches 4a through 4c with weighting factors $g_1$ through $g_3$ and determines a weighted time offset τ according to the formula $$τ=1/n(τ_1·g_1+τ_2·g_2+\ldots τ_n·g_n).$$

In addition to the arithmetic means, also other averaging or calculating functions can be used.

In the simplest case, various weighting factors $g_1$ through $g_n$ are equal to 1, so that a similar weighting of the various demodulation branches results. It is, however, beneficial to weight the different demodulation branches differently to achieve the highest possible exactness of the time offset τ and the smallest possible variance of the time offset τ estimated with the inventive procedure.

In a shifting and interpolation stage 9 the input signal S taken from the memory 5 is time-shifted according to the determined and weighted time offset τ. Also during this shifting preferably an interpolation takes place so that not only a shifting through integral multiples of the sampling period can be carried out, but also intermediate values as well.

The plurality of demodulation branches 4a through 4c shown in FIG. 1 is not absolutely necessary to the invention. The invention can also be carried out with a single demodulation channel.

It should be emphasized that the block diagram illustrated in FIG. 1 must not necessarily be technically realized as a circuit (as hardware). Preferably, the invention is implemented by program steps (as software).

Figure 2:
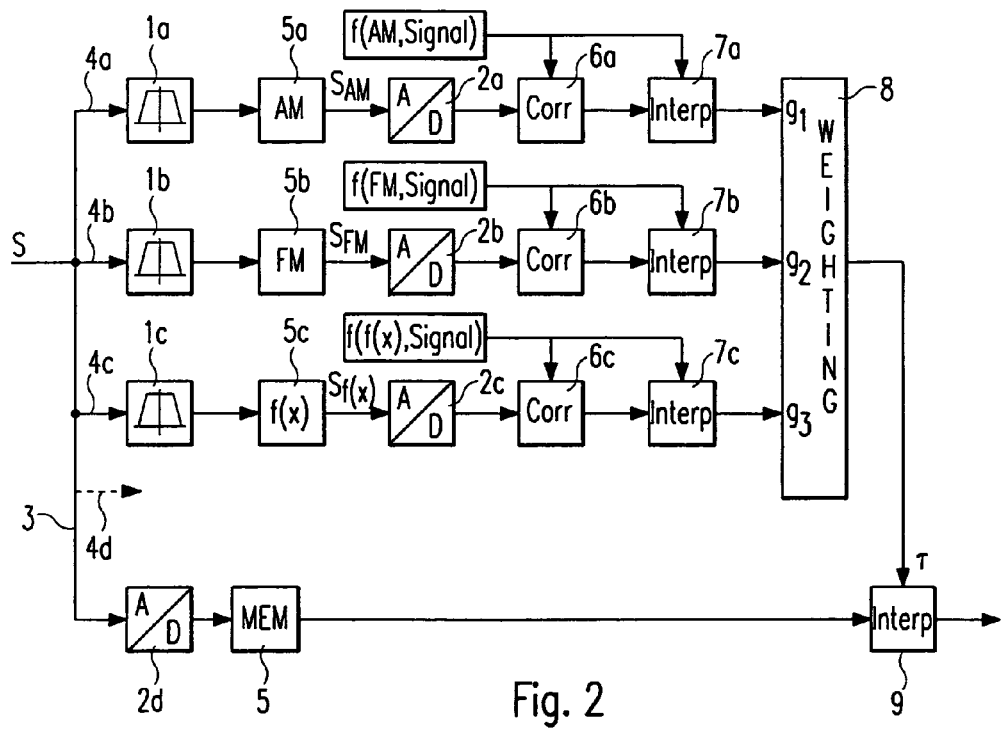
FIG. 2 is a block diagram illustrating a second embodiment of the process according to this invention.

FIG. 2 shows a block diagram of a second embodiment of the invention. Elements described above are identified with the same numerals so that to that extent repeated description can be avoided.

Contrary to the embodiment described in reference to FIG. 1, in the embodiment of FIG. 2 the input signal S is already divided into the demodulation branches 4a through 4c and the measuring branch 3 at an analog level and it is subjected in the demodulation branches 4a through 4c to filtering with different filtering characteristics, for example different band widths, in the filters 1a through 1c. The demodulation in the demodulators 5a through 5c also takes place at an analog level before each demodulated signal $S_{AM}$, $S_{FM}$ and $S_{f(x)}$ respectively is fed to the analog/digital converter 2a through 2c. In the correlation stages 6a through 6c and the interpolation stages 7a through 7c the correlation and interpolation described above is carried out. The measuring signal 3 is, independently of the demodulation signals, converted in the analog/digital converter 2d into a digital signal and entered into the memory 5.

A benefit of the FIG. 2 embodiment is that the filter characteristic of each filter 1a through 1c can be adapted to the corresponding demodulation method. Further, the filter characteristic can also be chosen such that one modulation method can be converted into another modulation method. For example, a edge demodulation can be carried out by an amplitude demodulator through a combination of a small band, shifted relative to a middle frequency, filter; and thus a frequency-modulated portion of the input signal S is measured with an amplitude demodulator. Various filters can be switched into a single demodulator in a time-wise manner so that, depending on the particular filter characteristics of the various filters, different signal parameters can be measured at the demodulator.

These variation possibilities also arise, of course, by exchanging the demodulators 5a through 5c of FIG. 2 with the analog/digital converters 2a through 2c. A further filter can be provided in the measuring branch 3, which is not shown in FIG. 2, which also can have a filter characteristic that is different from those of the demodulation branches 4a through 4c.

The correlation in the correlation stages 6a through 6c can, for example, be carried out by convolution, or hash coding, in time domain by means of a finite-impulse-response (FIR) filter or also by means of a Fourier transformation, multiplication in a frequency domain and finally a Fourier inverse transformation, which under certain conditions could provide a savings on computation time.

The interpolation functions used in the interpolation stages 7a through 7c can depend from the applied demodulation method, from the filter characteristic and further from the comparison signal (f (AM,Signal), f (FM,Signal) or f (f(x),Signal) and thereby be dependent on the synchronization sequence R.

The procedure of this invention is also suitable for characterizing the input signal relative to determining if, and possibly in which portion of the input signal, components with particular signal parameters are included; for example, to which portion of the input signal amplitude-modulated components and to which portion frequency-modulated components are included.

As mentioned above, the process of this invention is preferably carried out on the base band level so that the block diagram of FIG. 1 or 2 then is available for the in-phase (I) components and additionally for the quadrature-phase (Q) components. Further, then a base band mixer (not shown) must be provided after the analog/digital converter to create the I-components and the Q-components.

I claim:

1. A process for synchronizing an input signal including the following process steps:

demodulating the input signal according to a first demodulation method in relation to a first signal parameter for creating a first demodulated input signal;

correlating the first demodulated input signal with a first comparison signal that depends upon the first demodulation method to determine a time offset between the first demodulated input signal and the first comparison signal; and time-wise shifting the input signal in accordance with the time-wise offset determined by the correlation;

demodulating the input signal according to a second demodulation method in relation to a second signal parameter for creating a second demodulated input signal; and correlating the second demodulated input signal with a second comparison signal that depends upon the second demodulation method for determining a time offset between the second demodulated input signal and the second comparison signal.

2. The process according to claim 1, wherein the first demodulation method is amplitude demodulation and the first signal parameter is the amplitude and the second demodulation method is frequency demodulation in the second signal parameter is frequency.

3. A process for synchronizing an input signal including the following process steps:
   demodulating the input signal according to a first demodulation method in relation to a first signal parameter for creating a first demodulated input signal;
   correlating the first demodulated input signal with a first comparison signal that depends upon the first demodulation method to determine a time offset between the first demodulated input signal and the first comparison signal; and
   time-wise shifting the input signal in accordance with the time-wise offset determined by the correlation,
   wherein the input signal is demodulated according to n different demodulating methods in relation to n different parameters to create n different demodulated input signals, and
   wherein each demodulated input signal is correlated with an associated comparison signal dependent on the associated demodulation method to determine a time offset between each demodulated input signal and the associated comparison signal.

4. The process according to claim 3, wherein each demodulation method is defined by subjecting the input signal to one of a definite analytical and partially defined function f in order to create the associated demodulated input signal.

5. The process according to claim 4, wherein at least one of the functions is one of: amplitude demodulation; the logarithm of the amplitude demodulation; frequency demodulation; and the time differential of the frequency demodulation.

6. The process according to claim 1, wherein the different results of the correlations of the different demodulation methods are subjected to a weighting, with the correlation results of each demodulation method having a predetermined weighting factor applied thereto, for calculating the offset of the input signal.

7. A process for synchronizing an input signal including the following process steps:
   demodulating the input signal according to a first demodulation method in relation to a first signal parameter for creating a first demodulated input signal;
   correlating the first demodulated input signal with a first comparison signal that depends upon the first demodulation method to determine a time offset between the first demodulated input signal and the first comparison signal; and
   time-wise shifting the input signal in accordance with the time-wise offset determined by the correlation,
   wherein the input signal is subjected to an analog/digital conversion at one of before and after demodulation, and
   wherein each result of the correlation is subjected to a first interpolation between sampling points.

8. The process according to claim 7, wherein a filtering takes place at one of before and after the analog/digital conversion.

9. The process according to claim 8, wherein the filtering is carried out so that the first demodulation method is converted into another demodulation method.

10. The process according to claim 9, wherein the filtering is different for each demodulation method.

11. The process according to claim 7, wherein a first interpolation method used in the first interpolation depends upon one of: an associated demodulation method, the first comparison signal, f, f; and or the filtering.

12. The process according to claim 7, wherein the time offset of the input signal is subjected to a second interpolation between sampling points.

* * * * *